US006729198B2

United States Patent
Brandt

(10) Patent No.: US 6,729,198 B2
(45) Date of Patent: May 4, 2004

(54) GEARBOX

(75) Inventor: Martin Brandt, Thalmassing (DE)

(73) Assignee: Luk Lamellen und Kupplungsbau GmbH, Bühl (DE)

( * ) Notice: Subject to any disclaimer, the term of this patent is extended or adjusted under 35 U.S.C. 154(b) by 0 days.

(21) Appl. No.: 10/262,607

(22) Filed: Sep. 30, 2002

(65) Prior Publication Data

US 2003/0110875 A1 Jun. 19, 2003

Related U.S. Application Data

(63) Continuation of application No. PCT/DE01/01204, filed on Mar. 26, 2001.

(30) Foreign Application Priority Data

Apr. 3, 2000 (DE) .......................................... 100 16 543

(51) Int. Cl.$^7$ .............................................. F16H 59/00
(52) U.S. Cl. .............................. 74/337; 701/58; 701/68
(58) Field of Search ............................ 74/337; 701/51, 701/58, 68

(56) References Cited

U.S. PATENT DOCUMENTS

| 5,123,877 | A | | 6/1992 | Maucher et al. |
| 5,759,106 | A | | 6/1998 | Reik et al. |
| 6,243,637 | B1 | * | 6/2001 | Minowa et al. ............. 701/51 |
| 6,334,833 | B1 | * | 1/2002 | Ochi et al. ................ 477/143 |
| 6,514,166 | B2 | * | 2/2003 | Yuasa et al. ............... 475/125 |
| 6,526,343 | B2 | * | 2/2003 | Saito et al. ................ 701/51 |

FOREIGN PATENT DOCUMENTS

| DE | 44 26 260 A1 | 2/1995 |
| DE | 195 04 847 A1 | 9/1995 |
| DE | 196 27 980 A1 | 1/1997 |
| DE | 196 37 001 A1 | 3/1997 |

* cited by examiner

Primary Examiner—Dirk Wright
(74) Attorney, Agent, or Firm—Henry M. Feiereisen

(57) ABSTRACT

There is provided a method of controlling the operation of a multispeed gearbox which is associated with a start-up clutch, at least one power shift clutch, shift clutches for shifting into various speeds of the gearbox and with a control unit for controlling the actuation of at least one of the clutches. The method comprises the step of controlling the coefficient of friction of the at least one clutch during operation of the gearbox.

25 Claims, 2 Drawing Sheets

GEARBOX

This is a continuation of International Application Ser. No. PCT/DE01/01204, filed Mar. 26, 2001, the disclosure of which is hereby incorporated by reference.

BACKGROUND INFORMATION

There are gearboxes having a start-up clutch, one or more power shift clutches, shift clutches for shifting the various ratios or speeds of the gearbox and an actuation unit for actuating these clutches. During operation of these clutches, the coefficient of friction of power shift clutches or of the other clutches mentioned above may change, even for a short period of time, during the operation of the gearbox, for example, as a function of the clutch temperature. There are also other mechanical reasons for the change of the coefficient of friction such as wear and tear or abrasion of the friction plates of the clutches. This gives rise to a rather unpredictable control behavior, since a clutch, due to the difference between the value of the coefficient of friction selected by the actuation unit and the actual value of the coefficient of friction under certain circumstances, does not transmit the desired torque.

Thus, a need exists for an efficient method of controlling a gearbox, control unit and software for the control of the gearbox and/or gearbox for mitigating the problems associated with the above described gearboxes.

SUMMARY OF THE INVENTION

An exemplary embodiment of the present invention is directed to a method of controlling a gearbox, which is associated with a start-up clutch, at least one power shift clutch, shift clutches for shifting the gearbox into various speeds and a control unit for controlling the actuation of at least one selected clutch of the start-up clutch, the at least one power shift clutch and the shift clutches, the method comprising the step of: adapting a first coefficient of friction of the at least one selected clutch during operation of the gearbox by means of the control unit.

Another exemplary embodiment of the present invention is directed to a method of controlling a shifting process of a gearbox, which is associated with a start-up clutch, at least one power shift clutch, shift clutches for shifting various speeds of the gearbox and a control unit for controlling the actuation of at least one selected clutch of the start-up clutch, the at least one power shift clutch and the shift clutches, the method comprising the step of: controlling the torque which is adjustable by means of the selected clutch by means of the control unit, the controlling of the torque being performed by means of a torque control and a subsequent rotational speed control.

DETAILED DESCRIPTION

Figure 1:
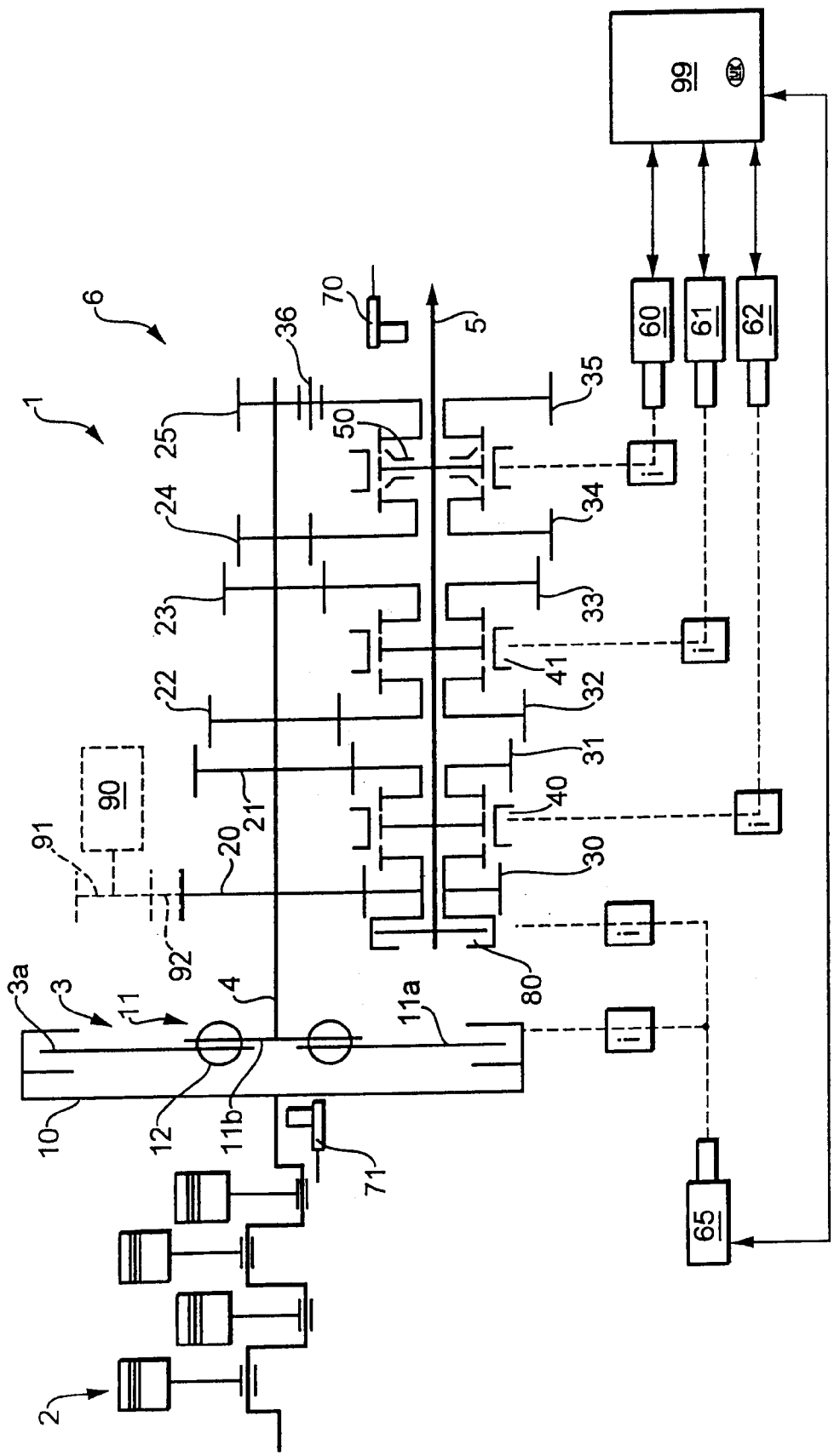
FIG. 1 is a schematic representation of an exemplary embodiment of a gearbox according to the present invention.

FIG. 1 schematically shows a gearbox 1 according to an exemplary embodiment of the present invention which may be installed in a motor vehicle. The gearbox 1 is arranged downstream of a drive unit 2, such as a motor or an internal combustion engine, and of a start-up clutch or shifting clutch 3, such as, for example a friction clutch. The gearbox 1 has an input shaft 4, a countershaft 5 and, if the case may be, an additional output shaft 6 whereby, in the exemplary embodiment of FIG. 1, the countershaft is identical with the output shaft. According to another exemplary embodiment, it may be advantageous that an output shaft 6 is provided in addition to the input shaft 4 and the countershaft 5. Between the motor 2 and the gearbox 1, a flywheel 10 is arranged, on which the friction clutch 3 including the pressure plate and the clutch cover is disposed. Instead of the rigid flywheel 10 one can employ a dual-mass flywheel which has two flywheel masses mounted rotatably relative to each other and which are rotatable against return forces generated by energy accumulators arranged, for example, between the flywheels. Reference may be had, for example, to commonly owned U.S. Pat. Nos. 5,759,106 or 5,123,877.

Between the friction plate 3a of the clutch 3 and the gear input shaft 4, a torsional vibration damper 11 is arranged. The torsional vibration damper may have at least two disk-shaped components 11a, 11b which are rotatable relative to each other. The at least two disk-shaped components 11a, 11b are rotatable against return forces from energy accumulators 12 arranged between the components. Friction surfaces or linings are preferably arranged radially outwards on a friction plate.

The shafts, such as the input shaft, the output shaft and, as the case may be, the countershaft, are mounted rotatably within the gearbox housing by means of bearings, and are centered in the radial direction and are mounted, as the case may be, in the axial direction. The bearings, however, are not explicitly shown.

The input shaft 4 and the output shaft 5 are at least substantially parallel to each other. According to another exemplary embodiment, the output shaft may be coaxial to the input shaft and the latter may also be mounted within the gear housing and may be centered therein.

The start-up or shifting clutch 3 may constitute a wet-plate friction clutch, for example, within the housing of the gearbox. According to another embodiment, the clutch 3 may constitute a dry-plate friction clutch, for example, within the clutch housing or bell between the motor 2 and the gearbox 1.

Axially fixed gear wheels 20, 21, 22, 23, 24 and 25 are non-rotatably connected with the input shaft 4 of the gearbox 1. The gear wheels 20 through 25, respectively, mesh with toothed wheels 30, 31, 32, 33, 34 and 35, such as idle gears, which are rotatable on the countershaft 5 and may be non-rotatably connected with the latter by means of clutches. An intermediate toothed wheel 36 between the toothed wheel 25 and the toothed wheel 35 serves to reverse the direction of rotation. The combination of the toothed wheels 25, 35, 36 thus represents the combination for the reverse gear R. The combination of the toothed wheels 24, 34 represents the combination for the first driving ratio or speed. The combination of the toothed wheels 23, 33 represents the combination for the second driving ratio. The combination of the toothed wheels 22, 32 represents the combination for the third driving ratio. The combination of the toothed wheels 21, 31 represents the combination for the fourth driving ratio. The combination of the toothed wheels 20, 30 represents the combination for the fifth driving ratio. The idle gear wheels 30 through 35, according to another embodiment, may also be arranged on the input shaft, and the gear wheels may be arranged on the countershaft. According to another embodiment, the idle gear wheels as well as the gear wheels may be provided on each shaft.

The toothed wheels 30, 31 may be connected non-rotatably in a form-locking manner with an axial displacement of the clutch 40 with the countershaft 5. The clutch 40 may be a shifting sleeve. The same applies for the toothed wheels 32, 33, which may be connected non-rotatably in a form-locking manner in response to axial displacement of the shifting sleeve 41 with the countershaft 5. This applies as well to the toothed wheels 34, 35, which may be connected non-rotatably and in a form-locking manner under an axial displacement of the shifting sleeve 42 with the output shaft 5. In each case, only one toothed wheel can be connected with the shaft by means of the respective shifting sleeve, since the shifting sleeve is able to establish a form-locking connection between the shaft and the toothed wheel in response to axial displacement in the one or the other axial direction, and the shifting sleeve is in each case arranged between two toothed wheels.

As may be taken from FIG. 1, the gearbox 1 has three structural units, each formed by two toothed wheel pairs or combinations and a clutch, such as a shifting sleeve, disposed between them. A first structural unit A is formed by the toothed wheel pairs 20, 30 and 21, 31 and the shifting sleeve 40. A second structural unit B is formed by the toothed wheel pairs or combinations 22, 32 and 23, 33 and the shifting sleeve 41. A third structural unit C is formed by the toothed wheel pairs or combinations 24, 34 and 25, 35, 36 and the shifting sleeve 42.

The shifting sleeves 40, 41 and/or 42 may constitute clutches such as positive locking clutches (or form-locking clutches) or claw clutches. Likewise, they may constitute frictionally engageable clutches having conical or circular friction surfaces including one or more friction faces, such as in a multiple disk clutch. Moreover, they may include synchronizing means with one or more synchronizing circuits 50. Likewise, one can employ combinations of frictionally engageable and form-locking clutches.

The toothed wheel pairs of the first gear and of the reverse gear constitute the first structural unit, the toothed wheel pairs of the second and third gears constitute the second structural unit, and the toothed wheel pairs of the fourth and fifth gears constitute the third structural unit. Other novel structural units may also be assembled.

The sleeves 40, 41 and 42 for shifting the speeds of the gearbox 1 are actuated, for example, in response to axial displacement by the actuating units 60, 61, 62, with a connection such as a linkage, a hydrostatic path, a cable, a Bowden wire or a shifting shaft being in each case provided between the actuating units and the shifting sleeves. The actuating unit may provide an electromotive, an electromagnetic and/or a pressurized fluid-activated drive, such as, for example, a hydraulic unit. Reference may be had to DE 44 26 260, DE 195 04 847, DE 196 27 980 and DE 196 37 001 which are incorporated herein by reference. Exemplary embodiments of the present invention moreover relate to these prior patent applications, the contents of which form part of the disclosure of the present patent application.

A transmission i may be provided in at least one connection between the actuating unit and the shifting sleeve.

The gearbox according to the present invention may also have a four-speed drive including a reverse gear (four forward acting drive gears) or a six-gear drive (six forward acting drive gears) without departing from the spirit of the invention.

A sensor 70 is provided to detect the output RPM of the gearbox, i.e. the RPM of the shaft 5. For detecting the input RPM of the gearbox, i.e., the RPM of the shaft 4, an additional RPM sensor may be provided. An RPM sensor 71 is provided to detect the RPM of the motor. For controlling the start-up/shifting clutch and the clutches for the gear ratio change, there is provided an electronic control unit which is equipped with a memory and a computer unit. The electronic control unit generates control signals by using the incoming signals from e.g. the sensors to thus drive the actuating units. The RPMs of the shafts may also be calculated on the basis of RPMs of other shafts and the given transmission ratio.

One of the toothed wheels 30 through 34 is connected with a clutch 80, such as a power shift clutch, which, when engaged, connects the one toothed wheel with the shaft 5. Clutch 80 may be actuated, such as engaged or disengaged, by the actuator 64 via connection 65b. The clutch 80 is preferably actuated by the same actuator as the start-up clutch or shifting clutch 3 which may be engaged or disengaged by means of the actuator 65 and a connection 65a. Alternatively, the clutch 80 can be actuated by a separate actuator.

It may be advantageous to mount the clutch 80 at that axial end of the shaft 5 which is adjacent to the clutch 3. According to another embodiment of the present invention, it is of advantage if the clutch 80 is arranged at that axial end of the shaft 5 which is opposite to the clutch 3.

A further advantageous feature of the gearbox according to the present invention is that via a toothed wheel of the gearbox, such as, for example, one of toothed wheels 20 through 24, an electric machine such as a starter, generator or a starter generator 90 of the drive motor may drive the shaft 4. An electric generator, such as a dynamo, may be driven thereby. The starter and the generator may be combined to form an electric machine such as a starter generator. The electric machine thus is able to start the engine; in a further operational mode, however, it may also provide for the torque delivered to the output drive of the gearbox, and hence may assist the engine of the motor vehicle. In an appropriate manner, the electric machine may even be used alone, when the torque or power requirements are low, for driving the vehicle at least through a short distance or for a short interval of time. According to yet another exemplary embodiment of the present invention, the electric machine may be used for transforming a part of the kinetic energy of the vehicle into electric energy, and to store it, for example, in an accumulator. This may, for example, take place in the coasting operation of the motor or engine 2, e.g., on the occasion of mountain descents and/or braking processes. A vehicle including a gearbox according to an exemplary embodiment of the present invention thereby may advantageously reduce the fuel consumption and the emission of pollutants. The electric machine may likewise increase the torque level during shifting operations.

The electric machine 90 may be driven, e.g. by a toothed wheel, and may be arranged in parallel to the input shaft or the output shaft of the gearing. An intermediate toothed wheel 92 may be provided between one of the gears, e.g., the gear 20, and the driving pinion 91 of the electric machine 90. The electric machine may also be driven by a belt or a chain. For the transmission and the drive from/to the electric machine, a continuously variable gear, a multi-step reduction gear, a reversible or a fixedly adjusted gear may be used.

Moreover, the electric machine may also be arranged coaxially to the input shaft of the gearbox.

According to an exemplary embodiment of the present invention, the gearbox is a power shifting gearbox or a gearbox which may change speeds under load. The power shifting is achieved or effected in that the combustion engine 2, including the input shaft 4, is decelerated by means of the power shift clutch 80 against the output drivetrain of the vehicle. In this manner, the kinetic energy of the motor 2 is partially transformed into kinetic energy of the vehicle.

According to the present invention, there is provided at least one clutch actuator which can actuate the start-up clutch or shifting clutch 3, as well as the power shift clutch 80. In this case, it may be advantageous that the start-up clutch or shifting clutch 3 be at least in part engaged while the power shift clutch is actuated. According to yet another exemplary embodiment of the present invention, it may be purposeful when the start-up clutch is already completely engaged.

The gearbox according to the present invention is particularly advantageous due to its simplicity and the small number of actuators.

The advantages of the gearbox of the present invention are: a high shifting convenience due to the practically interruption-free power shifting, a reduced length due to the partial omission of synchronization means, a low weight and a high efficiency.

In the gearbox according to the present invention, the kinetic energy of the motor or engine of the vehicle is not destroyed during the shifting operation, rather it is proportionally used as a drive moment or torque. Hence, the motor is braked against the output train. Consequently, interruption of tractive force no longer occurs. This may be particularly advantageous in tractive upshifts. It may also be advantageous in the event of reverse shifts during coasting because the kinetic energy of the vehicle is used to increase the motor speed.

The power shift gear 1 is a gear reducer unit with spur gears. The friction clutch 3 between the motor 2 and the input shaft 4 serves as the start-up clutch. The spring/damper system 11 as a torsional vibration damper means may be integrated in the clutch disk. The spring/damper system 11 may, however, also be integrated into a dual-mass flywheel.

The idle gears or wheels may be arranged on the input shaft or the countershaft and may be connectable thereto via clutches or shifting sleeves. The idle wheels may be connected with the shaft by means of shifting clutches; shifting sleeves connect the countershaft 5 with the idle wheels by means of, e.g., claw clutches. The form-locking clutch of the first or R gears may be combined with a friction clutch, such as a synchronizing gear, cf. the synchronizing circuit 50 for the first and R gears. The clutches 40, 41, 42 are actuated by means of at least one actuator.

The friction clutch 80, such as a power shift clutch, connects the idle wheel 30 of a high gear, e.g. of the fifth gear, with the shaft 5. The clutch actuator 65 actuates the power shift clutch 80, as well as the start-up clutch 3. The actuation path of the clutch actuator 65 is divided in such a manner that the power shift clutch 80 may only be engaged when the start-up clutch 3 is engaged.

The system further comprises an electronic control unit 99 including a microprocessor for electronically controlling the gearbox and the clutches, a speed detection means, an electronic throttle valve control or motor supply control, and an electronic motor control system for the combustion engine, a manually operable element for the gear selection, such as a lever, a switch or the like for the manual and/or automated gear selection and a display in the interior of the vehicle for displaying the gear. For this purpose, the control unit 99 is in communication with the actuators 60, 61, 62 and 65.

An electric machine, which may be used as a starter, a generator and also as a retarder or an add-on drive, may also be provided.

For a start-up process, a low gear (the first or the second speed or gear) is engaged in the gearbox. The start-up clutch 3 is engaged in response to actuation of the actuator 65, while the motor builds up torque under the actuation of the accelerator so as to accelerate the vehicle. The start-up process is completed when the start-up clutch transmits torque. The torque of the motor is then transmitted to the output shaft via the closed, i.e., fully engaged, clutch 3 and the selected gear.

The shifting operation is in each case initiated by the shifting desired by the driver or by the automatic control.

With tractive upshifts, the clutch actuator commences to close the power shift clutch 80 in a controlled manner, while the start-up clutch 3 remains closed, i.e. engaged. The more torque the power shift clutch 80 transmits, the less torque is applied to the clutches 40, 41 or 42 of the previously selected gear. When the torque being transmitted by the clutch of the previously selected gear has essentially decreased to zero, the clutch of the previously selected gear becomes disengaged. By means of the torque transmitted by the frictional power shift clutch 80, the RPM of the combustion engine, including the input shaft, is reduced, i.e., the kinetic energy of the engine is reduced. The torque of the engaged power shift clutch 80 is supported at the output train, and thus transfers a part of the kinetic energy of the internal combustion engine 2 to the vehicle. Thus, the torque at the output train is maintained during the synchronization process. Consequently, a power shifting is performed.

When the clutch 40, 41 or 42 of the new gear to be selected has reached the synchronous speed, such clutch is engaged by an actuator actuation. At the same time, the power shift clutch 80 is disengaged. The new speed has been selected and the shifting operation is terminated.

Shortly before reaching the synchronism RPM the clutch moment and the engine moment are controlled in such a way that the internal combustion engine is only slightly accelerated and, at synchronous speed, essentially is no longer accelerated. The clutch of the new gear is then engaged. When the shifting clutch is engaged, the power shift clutch is disengaged.

The power shift clutch 80 is preferably integrated into the idle wheel of the highest gear, but may also be mounted on an idle wheel of a lower gear. Due to this, the shifting operations in higher gears are no longer capable of being power shifted. Instead, the shifting operations in lower gears (new gear<=gear with power shift clutch) have less pronounced interruptions of tractive force.

The torque of the motor is increased. At the same time, the power shift clutch takes over torque, so that the shift clutch of the previous gear may be disengaged. Subsequently, the torque of the power shift clutch may be reduced, and the engine may be accelerated. Shortly before reaching the synchronous speed, the engine is braked and the gearbox is shifted into the newly selected speed. Now, the power shift clutch becomes disengaged, and the new gear takes over the engine torque.

In reverse shifts, the engine speed has to be increased. For this purpose, the inherent dynamics are used in order to increase the kinetic energy of the engine. The torque of the engine is reduced in a controlled manner. When the torque of the previous gear essentially has decreased to zero, then the clutch 40, 41 or 42 of the previous gear is disengaged. Now, the torque of the engine is increased, and the engine including the input shaft is accelerated. When the engine has reached the synchronous speed for the newly selected gear, the engine torque is lowered for a short period of time, and the clutch 40, 41 or 42 of the new gear is engaged. Now, the engine torque is again adjusted in a controlled manner according to the driver's wish.

Tractive reverse shifts may be designed to be more comfortable in high gears by means of the power shift clutch 80, in that a part of the engine torque intended for accelerating the internal combustion engine is supported by the drive train. Through the synchronizing operation is prolonged, the torque nevertheless does not collapse to zero.

When the gearbox has a second power shift clutch at the smallest gear, then in case of reverse shifts during coasting, the clutch may greatly accelerate the internal combustion engine against the output train. The vehicle will then be decelerated during the synchronizing operation, since the energy of the vehicle is branched off into the engine. Thus, the reverse shift during coast then is likewise power shifting. Instead of a power shift clutch, an efficient blocking synchronization, such as a double-cone synchronization, may be used when the gearbox is in the lowest or the reverse gear.

Figure 2:
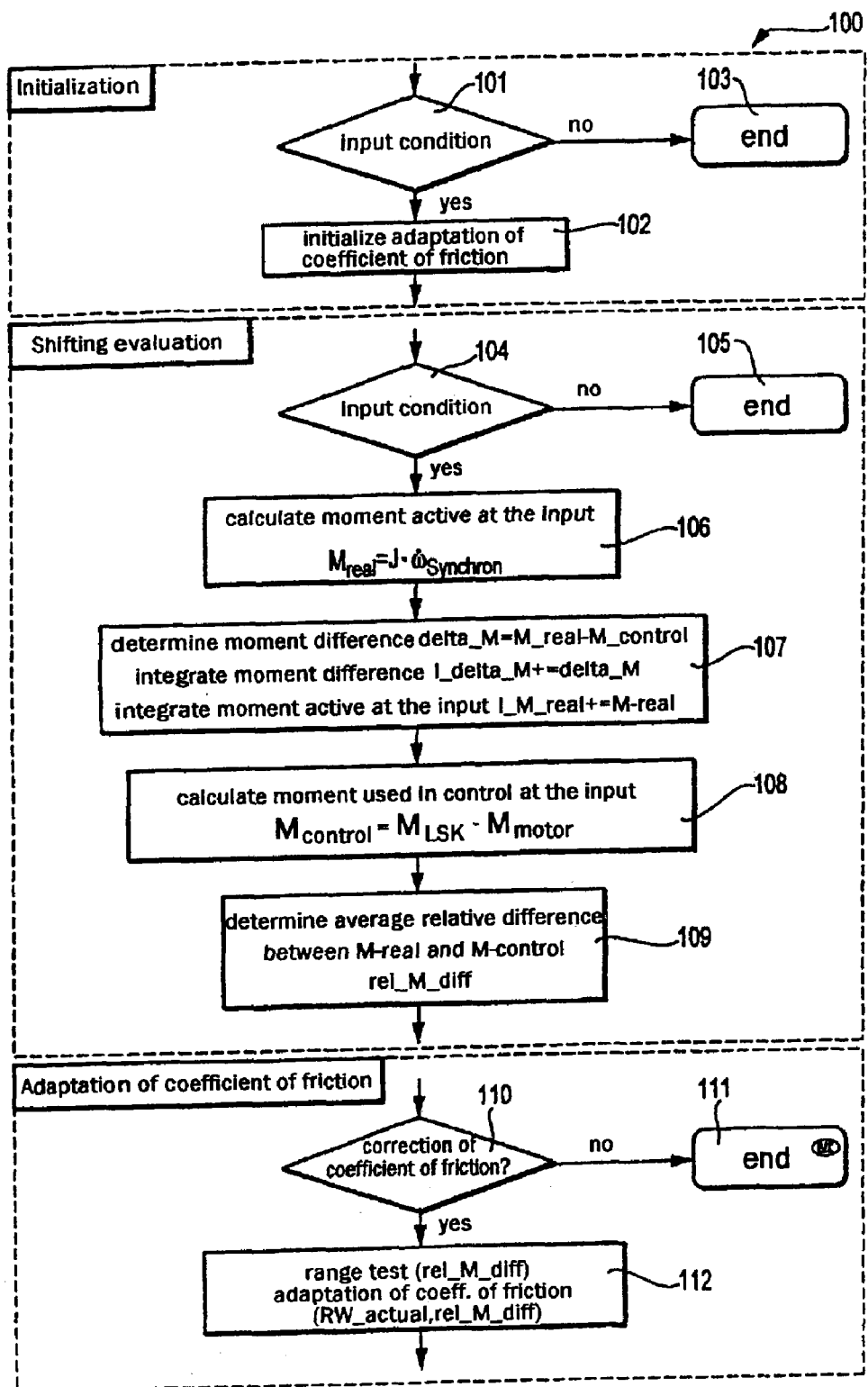
FIG. 2 is a diagram representing an exemplary embodiment of a method of adapting a coefficient of friction according to the present invention.

FIG. 2 shows a block diagram 100 representing an exemplary embodiment of a method of adapting a coefficient of friction according to the present invention. In block 101, it is inquired whether an input condition is present for carrying out an adaptation of the coefficient of friction, such as, for example, a secure vehicle condition when not in gear and with the brake actuated. If such condition prevails, the adaptation of the coefficient of friction is initialized in block 102. Otherwise, the operation will be terminated at block 103.

In block 104, a new entry condition is evaluated. If an entry condition is present, then the torque $M_{real}=J*d\omega_{synchron}/dt$ active at the input of the clutch will be determined at block or step 106. $M_{real}$ may be calculated, acquired or measured. Otherwise, the process will be terminated at block 105. $\omega_{synchron}$ is the RPM difference in the synchronization, and J is the mass moment of inertia of the clutch.

In block 107, the torque difference delta__M is determined versus M__real–M__control, i.e, the difference between the actually applied torque and the value of the torque used by the control unit.

Subsequently, the torque difference is integrated to J__delta__M+=delta M, and the torque active at the input is integrated to I__M__real+=M__real.

Subsequently, in block 108, the torque active at the input and used by the control unit, is determined to be:

M__control=$M_{LSK}-M_{motor}$, wherein $M_{LSK}$ is the torque transmittable by the power shift clutch, and $M_{motor}$ is the engine torque.

In block 109, an averaged difference between M__real and M__control is determined to be rel__M__diff.

In block 110, it is ascertained whether rel__M__diff is within a predetermined range permitting an adaptation of the coefficient of friction. If this is the case, the coefficient of friction RW will be adapted in block 112. Otherwise, the process will be terminated in block 111.

It is of particular advantage if the control takes place with a torque control and a subsequent speed regulation. In an advantageous manner, the control strategies may include:
control of the engine and clutch torque so as to effect a controlled synchronization process during a power shift
combination of torque control and rotational speed control so as to be able to reliably react to disturbances in the real system adaptation of the dynamic constants of the internal combustion engine (idle time and time constant of a PT1 model) required for controlling the uninterruptedly shifted gearbox (USG)

adaptation of the coefficient of friction of the power shift clutch during a power shift.

An exemplary shifting process may be briefly outlined by means of various phases of controlling a power shift. The shifting process of a 1–2 shift (from the first to the second gear) is initiated by setting the target gear to the second gear by the gear selection of the gear control.

(Initialization): The parameters required for the power shifting process are initialized, and the strategy according to which the engine and clutch torques are intended to be controlled during shifting are set.

(Torque adoption): The torque of the power shift clutch and the internal combustion engine are brought to predefined torque levels in a coordinated manner. The level of the torque at the power shift clutch LSK in this case is below that of the internal combustion engine, so as to prevent the gearbox from faulty gripping when the gear is shifted.

(Disengaging operation): So as to be able to disengage the actual gear, the shifting actuator is acted upon with a predefined force, and the torque of the power shift clutch LSK is further increased to the actual engine torque. The actual gear is hereby shifted out, i.e. disengaged.

(Torque control): The control of the synchronization process takes place in this state. The engine torque will, for example, be decreased abruptly. After the idle time of the internal combustion engine, the calculation of the switch-over time of the engine torque and the clutch torque takes place. The torque of the power shift clutch is increased to a higher level according to the strategy. The rotational speed of the engine and the gear input is reduced according to the gear transmission by the difference moment of the power shift clutch and the engine torque.

(RPM regulation or speed control): After the torque control has synchronized the major part of the RPM difference, the RPM control or regulation will be turned on. It is based on a PID regulator or controller that has the speed difference as a controlled variable and the torque of the power shift clutch as manipulated variable.

(Engaging operation): When the speed difference and the acceleration thereof has been set to a predefined value, the new gear will be engaged.

(Torque restoration): In this state, the torque of the internal combustion engine and the power shift clutch will be restored to predefined levels. The power shift clutch will be completely disengaged in the shifting process shown, and the shifting process is then completed.

In contrast to the aforementioned, according to a further exemplary embodiment of the present invention, a control may be provided which is slightly modified. The difference from the first strategy consists in that, based on the RPM difference to be synchronized and the torque levels of engine and clutch, not only the switch-over instant for the clutch torque and the engine torque is determined during the synchronization, but the ideal progress of the speed difference (DiffSpeedIdeal) to be synchronized is likewise calculated. The deviation of the real RPM difference from the ideal difference is then used as an input signal of a PID controller. The manipulated value of the regulator will then be added to that value of the power shift clutch torque which corresponds to the control strategy.

It is desired to achieve an adaptation of the dynamic constants of the internal combustion engine. The regulation of the synchronization process according to the proposed regulator preferably presupposes that the dynamic constants of the assumed internal combustion engine model—namely the idle time and the time constant, are known. These constants may be required in controlling the gearbox in the following situations:

coordination of engine and power shift clutch torque calculation of the ideal RPM progress during synchronization calculation of the torque level during synchronization These parameters are subject to variations that may be of short or long duration. In addition, these parameters depend on the respective operating point of the internal combustion engine (speed, torque). In order to satisfy such prerequisite, the idle time of the internal combustion engine, as well as its time constant is adapted. Furthermore, these parameters are stored in characteristic curves as a function of the operating point, so as to comply with the functional correlation between the dynamic constants of the engine and the respective operating points.

The patent claims which were filed with this application are merely proposals without prejudicing the obtaining of additional and/or broader patent protection. Furthermore, Applicants and their Assignee reserve the right to claim features which, heretofore, can be found solely in the specification and/or the drawings.

References made in the dependent claims to preceding claims are indicative of additional developments of the matter of the independent claims, such as of combinations of the features recited in the parent claims and in the respective dependent claims; they do not constitute a waiver of the acquisition of independent protection for the features of such dependent claims.

Thus, the features recited in the dependent claims can constitute independent inventions having a standing of their own, regardless of the subject matter recited in the respective parent claims.

Since the features and/or subject matter of the dependent claims may be independent inventions in view of the state of prior art at the priority date, the Applicants and their Assignee reserve the right to make these features the subject matter of independent claims or dependent claims of a divisional application.

Moreover, the invention is not limited to the described and illustrated embodiment or embodiments. On the contrary, the invention encompasses numerous changes and modifications, including, for example, all such modifications, and elements, combinations and/or materials which are or can be deemed to be novel and can be derived from or arrived at upon perusal of the specification and/or the present claims and/or the present drawings, not only as regards the structural features, but also concerning the method or methods, and/or the process or processes of manufacturing, assembling, converting, modifying, testing, and/or others.

What is claimed is:

1. A method of controlling a gearbox, the gearbox having a start-up clutch, at least one power shift clutch, shift clutches for shifting various transmissions of the gearbox and a control unit for controlling an actuation of at least one clutch selected from the group consisting of the start-up clutch, the at least one power shift clutch and the shift clutches, the method comprising the step of:

adapting a first coefficient of friction of the at least one clutch selected from the group consisting of the start-up clutch, the power shift clutch and the shift clutches during operation of the gearbox by means of the control unit.

2. The method of claim 1, further comprising the step of:

determining a first torque active at an input of the at least one clutch selected from the group consisting of the start-up clutch, the power shift clutch and the shift clutches for the adaptation of the first coefficient of friction.

3. The method of claim 1, further comprising the step of:

determining a second torque active at an input of the gearbox which is used by the control unit.

4. The method of claim 1, further comprising the steps of:

determining a first torque active at an input of the at least one clutch selected from the group consisting of the start-up clutch, the power shift clutch and the shift clutches for the adaptation of the first coefficient of friction;

determining a second torque active at an input of the gearbox which is used by the control unit;

determining a difference between the first torque and the second torque, and determining a temporal mean value of the difference.

5. The method of claim 4, wherein the adaptation of the first coefficient of friction of the at least one clutch selected from the group consisting of the start-up clutch, the power shift clutch and the shift clutches is based on one of the difference and the temporal mean value.

6. The method of claim 5, wherein the adaptation of the first coefficient of friction of the at least one clutch selected from the group consisting of the start-up clutch, the power shift clutch and the shift clutches is further based on an earlier second coefficient of friction of the at least one clutch selected from the group consisting of the start-up clutch, the power shift clutch and the shift clutches.

7. The method of claim 1, further comprising the step of:

controlling a third torque which is adjustable by means of the at least one power shift clutch by means of the control unit;

wherein the controlling of the third torque is performed by means of a torque control and a subsequent rotational speed control.

8. The method of claim 1, further comprising the step of:

effecting the selection of torque transmittable by the at least one power shift clutch by regulating the torque and by thereupon regulating the RPM.

9. A gearbox comprising:

a start-up clutch;

at least one power shift clutch;

shift clutches for shifting various transmissions of the gearbox; and a control unit for use with the gearbox for controlling an actuation of at least one clutch selected from the group consisting of the start-up clutch, the at least one power shift clutch and the shift clutches;

wherein the control unit controls a first coefficient of friction of the at least one clutch selected from the group consisting of the start-up clutch, the power shift clutch and the shift clutches during operation of the gearbox.

10. The gearbox of claim 9, wherein the control unit is further adapted for determining a first torque active at an input of the at least one clutch selected from the group consisting of the start-up clutch, the power shift clutch and the shift clutches for the adaptation of the first coefficient of friction.

11. The gearbox of claim 9, wherein the control unit is further adapted for determining a second torque active at an input of the gearbox.

12. The gearbox of claim 9, wherein the control unit is further adapted for determining a first torque active at an input of the at least one clutch selected from the group consisting of the start-up clutch, the power shift clutch and the shift clutches for the adaptation of the first coefficient of friction;

determining a second torque active at an input of the gearbox;

determining a difference between the first torque and the second torque, and determining a temporal mean value of the difference.

13. The gearbox of claim 12, wherein the control unit is further adapted to control the first coefficient of friction of the at least one clutch selected from the group consisting of the start-up clutch, the power shift clutch and the shift clutches based on one of the difference and the temporal mean value.

14. The gearbox of claim 13, wherein the control unit is further adapted to control the first coefficient of friction of the at least one clutch selected from the group consisting of the start-up clutch, the power shift clutch and the shift clutches based on an earlier second coefficient of friction of the at least one clutch selected from the group consisting of the start-up clutch, the power shift clutch and the shift clutches.

15. The gearbox of claim 9, wherein the control unit controls a third torque which is adjustable by means of the at least one power shift clutch by means of a torque control and a subsequent rotational speed control.

16. A controller for a gearbox, the gearbox having a start-up clutch, at least one power shift clutch and shift clutches for shifting various transmissions of the gearbox, wherein the at least one clutch selected from the group consisting of the start-up clutch, the power shift clutch and the shift clutches has a first coefficient of friction, the controller comprising a controlling unit;

wherein the controlling unit adapts the first coefficient of friction of the at least one clutch selected from the group consisting of the start-up clutch, the power shift clutch and the shift clutches during operation of the gearbox.

17. The controller of claim 16, wherein the control unit is further adapted for determining a first torque active at an input of the at least one clutch selected from the group consisting of the start-up clutch, the power shift clutch and the shift clutches for the adaptation of the first coefficient of friction.

18. The controller of claim 16, wherein the control unit is further adapted for determining a second torque active at an input of the gearbox.

19. The controller of claim 16, wherein the control unit is further adapted for determining a first torque active at an input of the at least one clutch selected from the group consisting of the start-up clutch, the power shift clutch and the shift clutches for the adaptation of the first coefficient of friction;

determining a second torque active at an input of the gearbox;

determining a difference between the first torque and the second torque, and determining a temporal mean value of the difference.

20. The controller of claim 16, wherein the control unit controls a third torque which is adjustable by means of the at least one power shift clutch by means of a torque control and a subsequent rotational speed control.

21. A microprocessor memory for a control unit, wherein the control unit controls a gearbox, the gearbox having a start-up clutch, at least one power shift clutch, shift clutches for shifting various transmissions of the gearbox and a control unit for controlling an actuation of at least one clutch selected from the group consisting of the start-up clutch, the at least one power shift clutch and the shift clutches, wherein the microprocessor memory is encoded with executable instructions for performing the following step when executed on the microprocessor:

adapting a first coefficient of friction of the at least one clutch selected from the group consisting of the start-up clutch, the power shift clutch and the shift clutches during operation of the gearbox.

22. The microprocessor memory for a control unit of claim 21, wherein the microprocessor memory is furthermore encoded with executable instructions for performing the following step when executed on the microprocessor:

controlling a third torque which is adjustable by means of the at least one power shift clutch;

wherein the controlling of the third torque is performed by means of a torque control and a subsequent rotational speed control.

23. A method of regulating the operation—including shifting into any one of a plurality of different speeds—of a multispeed gearbox associated with first clutch means including a start-up clutch, second clutch means including at least one power shift clutch, third clutch means including clutches for shifting into selected speeds, and a unit for controlling the actuation of at least one of said clutch means, comprising the step of adapting a coefficient of friction of said at least one clutch means by way of said control unit during operation of the gearbox.

24. The method of claim 23, further comprising the step of determining for the adaptation of the coefficient of friction a torque M-real which is effective at an input of the at least one clutch means, said determining step including one of the undertakings comprising predetermination and calculation.

25. The method of claim 24, further comprising the step of utilizing by the control unit that value M_steuerung of torque which is being transmitted at an input of the at least one clutch means.

* * * * *